United States Patent [19]

Lammers

[11] 4,072,673
[45] Feb. 7, 1978

[54] METHOD FOR MAKING A FLEXIBLE MOLD

[75] Inventor: Peter C. Lammers, Doylestown, Ohio

[73] Assignee: The Goodyear Tire & Rubber Company, Akron, Ohio

[21] Appl. No.: 196,754

[22] Filed: Nov. 8, 1971

Related U.S. Application Data

[63] Continuation of Ser. No. 873,656, Nov. 3, 1969, abandoned.

[51] Int. Cl.² .................... B29C 5/00; B29D 9/08
[52] U.S. Cl. .................... 264/225; 264/250; 264/259; 264/299
[58] Field of Search .......... 264/219, 225, 226, 227, 264/334, 337, 338, 264, 259, 313, 45, 54

[56] References Cited

U.S. PATENT DOCUMENTS

| | | | |
|---|---|---|---|
| 2,435,643 | 2/1948 | Bean | 264/227 |
| 3,428,725 | 2/1969 | Delmonte et al. | 264/338 X |
| 3,487,134 | 12/1969 | Burr | 264/45 |
| 3,655,840 | 4/1972 | Krug | 264/225 X |
| 3,694,530 | 9/1972 | Wolfe | 264/338 |

FOREIGN PATENT DOCUMENTS 664,192  6/1963  Canada ................ 264/45

Primary Examiner—Willard E. Hoag
Attorney, Agent, or Firm—F. W. Brunner; J. D. Wolfe

[57] ABSTRACT

This invention relates to a flexible mold and a process of making wherein a composition or laminate is formed to give the mold the desired solvent resistance and yet maintain its flexibility.

2 Claims, 1 Drawing Figure

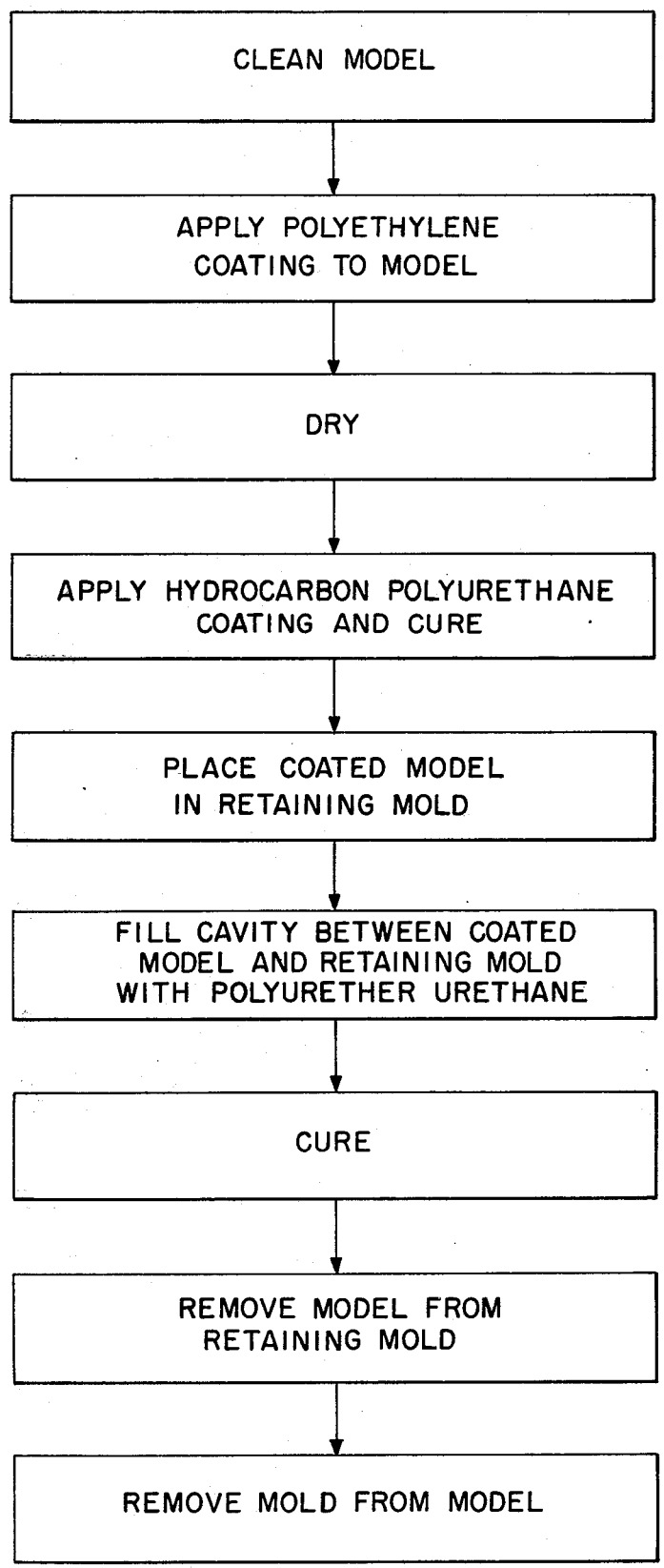

METHOD FOR MAKING A FLEXIBLE MOLD

This is a continuation of application Ser. No. 873,656 filed Nov. 3, 1969, and now abandoned.

This invention relates to a method of producing flexible molds and to said molds. More particularly, this invention relates to a flexible polyurethane mold which has good solvent and hydrolysis resistance.

The use of flexible molds in the production of articles which normally produce die-lockable articles has been desired for some time and recently the production of molded articles having shapes that result in the article being locked in the die has been achieved by the use of flexible molds made of silicone rubber. Unfortunately, silicone rubber has physical properties such that the mold life is relatively limited since the silicone rubber tends to tear, stretch or otherwise become marred with use or by chemical attack.

Although the polyurethane, Adiprene L, cured with MOCA, had been utilized to prepare molds, these molds have suffered from the disability that they were readily swelled in the more polar solvents and also were not too flexible where the mold had relatively thick sections. A further disadvantage experienced with the use of these molds is where a skin of polyurethane is formed on the mold and then the skin is filled with foam to give a finished article such as a seat cushion or crash pad. In this operation there tends to build up a deposit on the mold which has to be removed periodically to keep the mold from becoming fouled and producing skins which do not have the desired aesthetic appearance and design effects. The treatment to remove these deposits usually are an acid wash followed by a water wash. Since polyurethanes generally have poor acid resistance and hydrolysis resistance, the polyurethanes such as Adiprene L have been found to be unsatisfactory for such use.

Therefore, an object of this invention is to provide a flexible mold which does not contain the inherent disadvantages associated with the use of the flexible silicone molds.

This object may be achieved by coating a suitable model with a film coat of a solvent-resistant hydrocarbon type polyurethane and then reinforcing the film coat of hydrocarbon type polyurethane with a more conventional soft or flexible polyurethane to give a laminated article having the shape and surface characteristics of the model.

More specifically, a model such as a plaster of paris reproduction of an automobile crash pad or a seat cushion is coated with a suitable release agent such as a silicone mold release and a solvent or water dispersion of wax or a low molecular weight polyethylene. Then the model is given a coating of a polyurethane reaction mixture comprising a high molecular weight hydrocarbon diol or triol reacted with an organic diisocyanate such as methylene di(phenyl isocyanates), sometimes called MDI, containing a curative such as methylene orthochloroaniline, sometimes referred to herein as MOCA. Preferably, the initial film on the model is built of one or more coats to obtain a film or coating over the model of about 10-100 and preferably 20-50 mils in thickness. These coatings are allowed to stand at room temperature or preferably at an elevated temperature, for instance, about 140° F. until the solvent is evaporated and the ingredients of the polyurethane reaction mixture have reacted sufficiently to give the film sufficient strength to be moved while in position on the model. With the model having the film thereon in a state that the model and film can be moved without disturbing the surface of the film, it is placed within the cavity of a retaining mold that is slightly larger than the model and its film. Preferably the clearance between the film and the model and the surface of the cavity of the retaining mold is at least 0.1 inches and preferably about ⅛ to ½ inches. Prior to the time the model and film is placed within the cavity of the retaining mold, preferably the surface of the cavity of the mold has been coated with a suitable release agent and has received a sufficient amount of a liquid polyurethane reaction mixture to fill the space or clearance between the cavity of the retaining mold and the film on the model so that when the liquid polyurethane reaction mixture has fully reacted it will be bonded to the film on the model to form a laminate having sufficient strength to permit the polyurethane laminate to be removed from the cavity of the retaining mold and the model to yield the desired flexible mold.

The nature of this invention may be more readily understood by reference to the following example wherein the parts are by weight unless otherwise designated.

EXAMPLE I

A model of the article to be prepared, for instance, a C-shaped automobile arm rest which has been formed from plaster of paris by a suitable shaping and carving to give the desired surface design effects, is used as a model. This model is cleaned, preferably with a solvent or other suitable cleanser to remove any oil, dirt or other foreign matter thereon. Then the model is coated with a hexane solution of a low molecular weight polyethylene of the type used as a release agent and allowed to stand at room temperature until the hexane has evaporated. The model then is given a spray coat of a liquid hydrocarbon type polyurethane reaction mixture. A second spray coat of the same material is applied to form a film over the plaster of paris model at least 20 mils thick and preferably about 40 mils thick. The model is allowed to stand in a hot air oven at 140° F. for 30 minutes. While the model is in the oven a retaining mold having a cavity cut therein sufficient to give a clearance of ¼ of an inch between the plaster of paris model is prepared by coating the exposed surface of the cavity of the retaining mold with the hexane solution of the low molecular weight polyethylene suitable for use as a release agent. Essentially at the time the plaster of paris model with the polyurethane skin thereon is removed from the oven, sufficient liquid polyetherurethane reaction mixture is placed in the cavity of the retaining mold to fill the mold within the model with the film thereon placed within the cavity and pushed down to bring the model to the desired depth within the cavity. The polyetherurethane reaction mixture within the cavity of the retaining mold is allowed to react and cure while in contact with the film on the model. This is preferably achieved by placing the retaining mold with the model therein in an air-cured oven at a temperature of 140° F. for at least 30 minutes, or letting the material stand at room temperature overnight.

After the liquid polyetherurethane reaction mixture is reacted and cured the model is removed from the cavity of the retaining mold and the polyurethane film having the polyetherurethane layer adhered thereto is stripped from the model to obtain a flexible polyurethane mold.

The produced polyurethane flexible mold was then used in a production line to produce C-shaped automobile arm rests wherein a polyesterurethane reaction mixture was sprayed on the surface of the mold to form a skin and then after the skin had formed within the polyurethane mold the cavity was filled with a polyurethane foam of the polyether type and then the resulting C-shaped arm rest was removed from the polyurethane mold. This mold was used repeatedly in the production of C-shaped arm rests which resulted in the mold being subjected to solvents such as toluene, methylethyl ketone or methylene chloride and periodically to acid and water washes to remove the deposits that built up during use and was found to perform satisfactorily. This flexible polyurethane mold was able to resist the tendency to tear or to deteriorate during acid and water washing or swell or deform under contact with solvent.

When toluene diisocyanate was used to replace MDI in the above reaction mixtures, satisfactory flexible molds were produced.

Instead of the polybutadiene diol or triol of about 1000 to 4000 molecular weight used to make the hydrocarbon type polyurethane reaction mixture, other diol or triols such as the hydroxyl terminated polymers or dienes of the conjugated dienes have 2 to 10 carbon atoms such as isoprene, ethyl butadiene or their copolymers with styrene can be used. Normally the hydrocarbon polyurethane reaction mixture contains about 1.1 and preferably 1.5 to 3 mols of an organic diisocyanate, preferably toluene diisocyanate, or MDI, for each mol of hydroxyl terminated polymer or diene which may be reacted first to form a prepolymer or can be used in a one-shot method and the excess isocyanate is cured with a curative, usually about 0.1 to 1.1 mols, and preferably about 0.5 to 0.95 mols. The preferred curatives are the organic diamines, either those that exhibit a turbidity before or after 30 seconds in the hot methylene chloride test with the organic diisocyanate being used.

Representative members of the diamines useful in this invention are MOCA, methylene dianiline, tolyene diamine, ethylene diamine, isophorone diamine, 1,4-cyclohexane bis-methylamine, and xylylene diamine.

The conventional flexible polyurethane of either the polyester or polyether polyols can be used to fill the space between surfaces of the cavity of the retaining mold and the film on the model.

These polyester polyols or polyether polyols can be used in the same molar ratio as hydroxyl-terminated polymers in the hydrocarbon type polyurethane reaction mixture. The preferred polyether diols are propylene ether glycol or mixtures with the triol and these preferably have a molecular weight of about 1000 to 3000 molecular weight. Any of the polyester diols or triols of about 1000 to 3000 molecular weight can be used with the preferred ones being the polyesters of the dicarboxylic acids of 4 to 10 carbon atoms, such as adipic and azelaic and the glycols of 2 to 10 carbon atoms such as ethylene glycol, propylene glycol or butylene glycol.

What is claimed is:

1. A method of making a flexible mold comprising the steps of
   1. forming a film of a hydrocarbon polyurethane of about 10–100 mils in thickness on a model, said hydrocarbon polyurethane comprising the reaction product of a hydrocarbon polyol and an organic polyisocyanate,
   2. placing the model with the film thereon in the cavity of a retaining mold having a clearance of at least 0.1 inches between the film on the model and the surface of the cavity of said retaining mold,
   3. filling said clearance with a liquid polyetherurethane or polyesterurethane reaction mixture and reacting said mixture to form a polyurethane layer adhered to said film to form a flexible mold, and
   4. removing the mold from the retaining mold and model.

2. A flexible mold having a shaping face formed of a film of a hydrocarbon polyurethane of about 10 to 100 mils in thickness and having a flexible layer of a polyurethane of a polyester or a polyether polyol adhered to the other side of the film to give a laminate of at least a tenth of an inch thick, said hydrocarbon polyurethane being the reaction product of an organic diisocyanate, a hydrocarbon polyol of 2 to 3 hydroxyl groups and an organic diamine, said hydrocarbon polyol being hydroxyl terminated polymers of a conjugated diene of 4 to 10 carbon atoms or a copolymer of said diene and styrene, and the flexible layer being a polyetherurethane or a polyesterurethane.

* * * * *